US012765709B2

(12) United States Patent
Miller et al.

(10) Patent No.: US 12,765,709 B2
(45) Date of Patent: Oct. 20, 2026

(54) COFFEE SIEVE

(71) Applicant: Fellow Industries, Inc., San Francisco, CA (US)

(72) Inventors: Jacob Alan Miller, San Francisco, CA (US); Jacob Daniel DiMiceli, Orinda, CA (US)

(73) Assignee: Fellow Industries, Inc., San Francisco, CA (US)

( * ) Notice: Subject to any disclaimer, the term of this patent is extended or adjusted under 35 U.S.C. 154(b) by 1135 days.

(21) Appl. No.: 17/710,848

(22) Filed: Mar. 31, 2022

(65) Prior Publication Data

US 2022/0313001 A1 Oct. 6, 2022

Related U.S. Application Data

(60) Provisional application No. 63/169,190, filed on Mar. 31, 2021.

(51) Int. Cl.

| | |
|---|---|
| ***A47J 31/20*** | (2006.01) |
| ***A47J 31/00*** | (2006.01) |
| ***A47J 31/06*** | (2006.01) |
| ***B01D 29/35*** | (2006.01) |
| ***B01D 39/10*** | (2006.01) |

(52) U.S. Cl.

CPC ............. *A47J 31/20* (2013.01); *A47J 31/005* (2013.01); *A47J 31/06* (2013.01); *B01D 29/35* (2013.01); *B01D 39/10* (2013.01); *B01D 2201/184* (2013.01); *B01D 2239/1216* (2013.01)

(58) Field of Classification Search

CPC .......... A47J 43/22; A47J 31/20; A47J 31/005; A47J 31/06; B01D 29/35; B01D 39/10; B01D 2201/184; B01D 2239/1216

USPC .......... 210/474; 209/44, 240, 614, 346, 374; 222/189.06, 189.11, 189.02, 189.03

See application file for complete search history.

(56) References Cited

U.S. PATENT DOCUMENTS

| | | | | | |
|---|---|---|---|---|---|
| 671,640 | A * | 4/1901 | Smith | 210/474 | |
| 1,605,887 | A * | 11/1926 | Banks | A47J 43/22 | 210/477 |
| 2,717,723 | A * | 9/1955 | Brunsting | A47G 19/24 | 241/168 |
| 4,307,808 | A * | 12/1981 | Johnson | A47J 43/22 | 209/675 |
| 8,132,578 | B2 * | 3/2012 | LoPrete | A45D 33/025 | 206/823 |

(Continued)

FOREIGN PATENT DOCUMENTS

KR 20160002041 U * 6/2016 .............. A47J 43/22

*Primary Examiner* — Justin C Dodson
*Assistant Examiner* — Keith Brian Assante
(74) *Attorney, Agent, or Firm* — Cognition IP, P.C.; Edward Steakley; Justin White

(57) ABSTRACT

Various embodiments of an apparatus, methods and systems described herein are directed to a Sieve. The Sieve includes a removable filter that can be disposed within an interior of a hollow sieve body. The hollow sieve body has a first opening and a second opening. When the removable filter is disposed within the interior of the hollow sieve body, a first edge of the removable filter is situated on an edge of the first opening of the hollow sieve body. A detachable lid assembly connects to the first opening of the hollow sieve body and a detachable cap may be connected to the second opening of the hollow sieve body.

15 Claims, 5 Drawing Sheets

(56) References Cited

U.S. PATENT DOCUMENTS

| | | | | |
|---|---|---|---|---|
| 11,814,218 | B2 * | 11/2023 | Reiley | B65D 51/1644 |
| 2003/0006176 | A1 * | 1/2003 | Chang | C02F 1/003<br>210/477 |

* cited by examiner

COFFEE SIEVE

CROSS-REFERENCE TO RELATED APPLICATIONS

This application claims priority to U.S. Provisional Patent Application No. 63/169,190, filed Mar. 31, 2021, which is hereby incorporated by reference in its entirety.

SUMMARY

Various embodiments of an apparatus, methods and systems described herein are directed to a Sieve. The Sieve includes a removable filter that can be disposed within an interior of a hollow sieve body. The hollow sieve body has a first opening and a second opening. When the removable filter is disposed within the interior of the hollow sieve body and a first edge of the removable filter is situated on an edge of the first opening of the hollow sieve body. A detachable lid assembly connects to the first opening of the hollow sieve body and a detachable cap may be connected to the second opening of the hollow sieve body. The first opening and second opening of the hollow sieve body are interchangeable.

In some embodiments, when the detachable lid assembly is disconnected from the hollow sieve body, coffee grinds may be poured into the interior of the removable filter while it is inside of the hollow sieve body. The detachable lid assembly may then be connected to the hollow sieve body. A user may hold the hollow sieve body with one of their hands and may shake the hollow sieve body for a period of time, such as, for example, 30 seconds.

As the hollow sieve body shakes, the coffee grinds are filtered as a result of a portion of the coffee grinds passing through square-shaped holes of the removable filter. This stands in contrast to conventional approaches which rely on filter patterns based on circular filtering holes. The filtered portion of the coffee grinds that pass through the square-shaped holes are considered coffee fines that travel down a space that exists between the removable filter and the internal service of the hollows sieve body. The fines settle at an interior of the detachable cap and can be accessed via the detachable cap for removal. The coffee grinds that remain within the removable filter may be poured out of the hollow sieve body via the detachable lid assembly.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1:
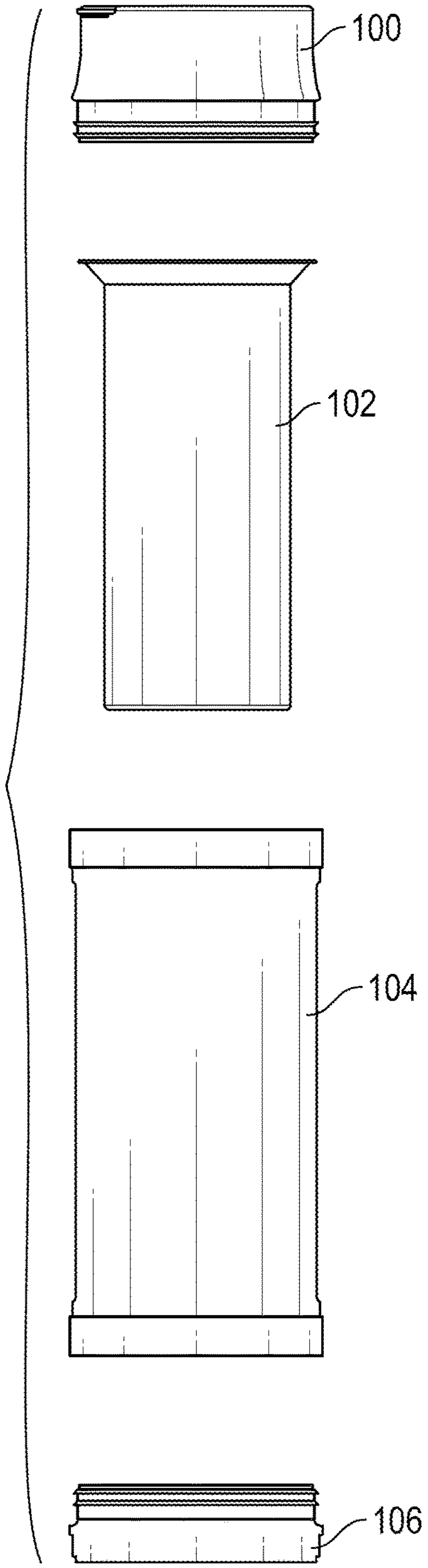
FIG. 1 is a diagram illustrating an exemplary embodiment.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially.

As shown in FIG. 1, various embodiments include at least a lid assembly 100, a removable filter 102, a hollow sieve body 104 and a detachable cap 106.

Figure 2:
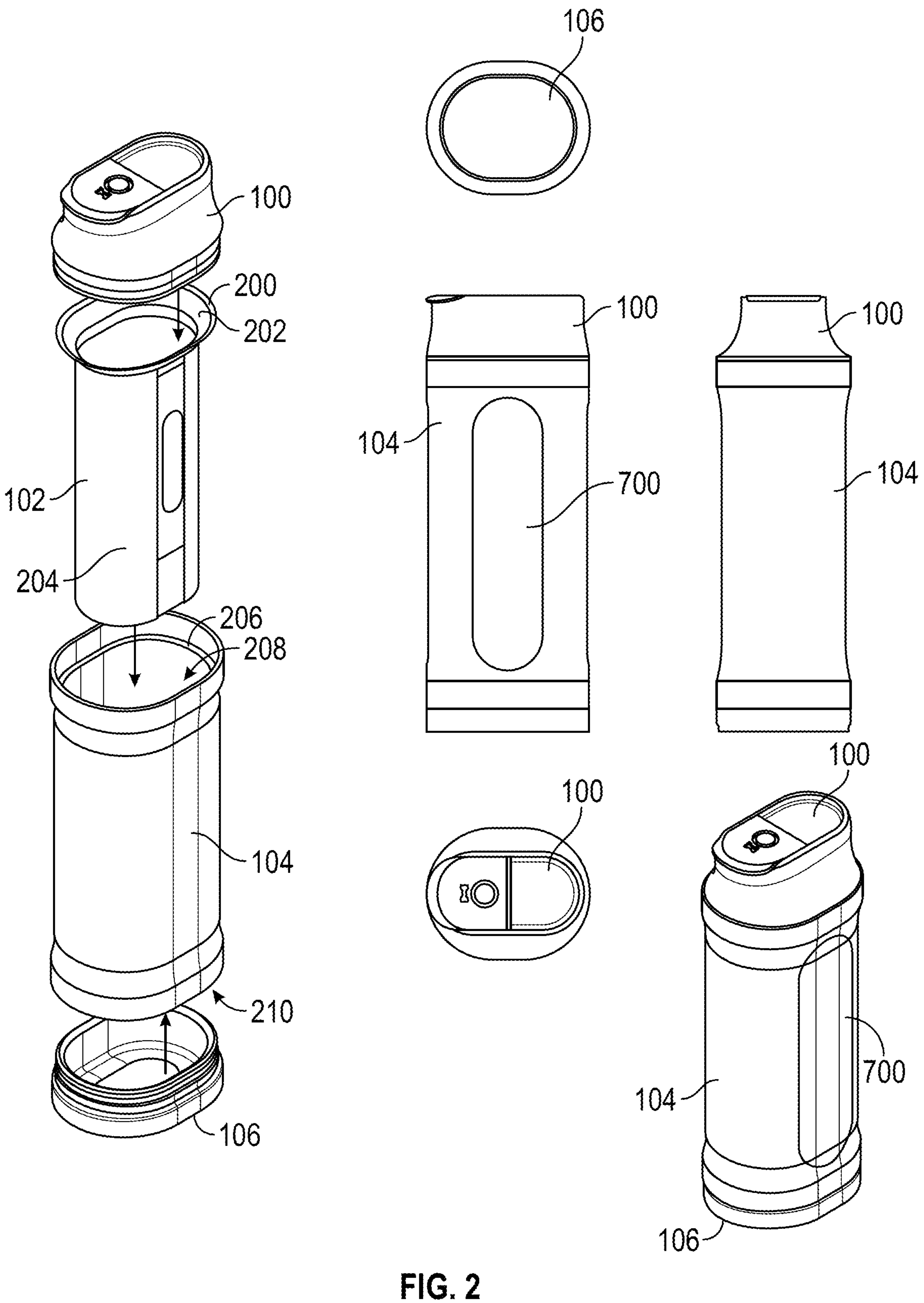
FIG. 2 is a diagram illustrating an exemplary embodiment.

As shown in FIG. 2, a removable filter 102 may be placed inside an interior of a hollow sieve body 104. The hollow sieve body 104 has a first and second opening 208, 210. When the removable filter 102 is disposed in the interior of the hollow sieve body 104, a first edge 200 of the removable filter 102 is situated on an edge 206 of the first opening 208 of the hollow sieve body 104. A detachable lid assembly 100 can be connected to the first opening 208 of the hollow sieve body 104, holding the solid surface 202 of the removable filter 102 in place. For example, the lid assembly 100 has a silicone gasket that enables the lid assembly 100 to be temporarily connected to at least a portion of the solid surface 202. A detachable cap 106 may connect to the hollow sieve body 104 at the second opening 210 of the hollow sieve body via a silicone gasket.

According to various embodiments, the hollow sieve body 104 is composed at least in part of Tristan plastic and further may be a hand-held sieve. In some embodiments, the hollow sieve body 104 may be entirely composed of Tritan plastic. The removable filter 102 includes a filter portion 204 along with a solid surface 202. The filter portion 204 is composed at least in part of SUS304 stainless steel etched with a plurality of square-shaped filter holes for 200 micron-shaped particles. In various embodiments, the filter portion 204 may be entirely composed of SUS304 stainless steel etched with a plurality of square-shaped filter holes for 200 micron-shaped particles.

When the removable filter 102 is disposed within an interior of the hollow sieve body 104, a spacing may exist between the removable filter 102 and the hollow sieve body 104. Coffee grinds may be poured into the removable filter 102 and fines may pass through the square-shaped filter holes of the filter portion 204 into the spacing and further travel down to the detachable cap 106 when the detachable cap 106 is affixed to the hollow sieve body 104. In various embodiments, the detachable cap 106 is composed at least in part of polypropylene. In various embodiments, the detachable cap 106 may be entirely composed of polypropylene.

Figure 3:
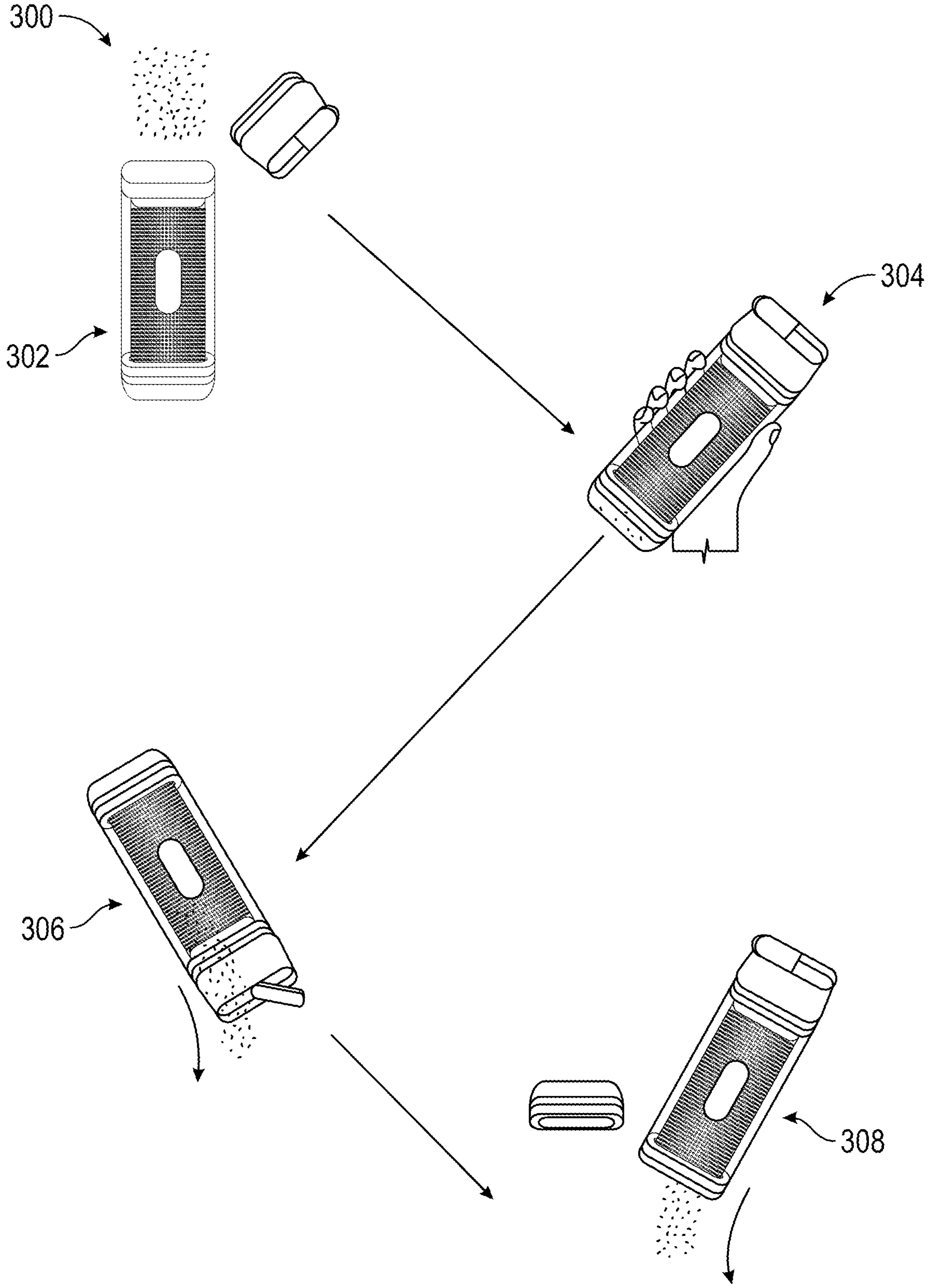
FIG. 3 is a flowchart illustrating an exemplary method.

As shown in flowchart 300 of FIG. 3, the removable filter 102 may be disposed within an interior of the body 104. The lid assembly 100 may either be not yet affixed to the solid surface 202 or may be decoupled from the solid surface 202. With the lid assembly 100 detached from the removable filter 102, coffee grinds may be poured into the interior of the removable filter 102. (Act 302) In some embodiments, the removable filter 102 may be a fine etched filter.

After the coffee grinds have been poured into the removable filter 102, the lid assembly 100 may be coupled to the removable filter 102. When both the lid assembly 100 and the detachable cap 106 are affixed such that the openings of the body 104 are sealed, the body 104 may be held in the hand(s) of an individual and may be shaken for a period of time. (Act 304) As the body 104 is shaken, the removable filter 102 filters the coffee grinds. For example, the filter portion 204 of the removable filter 102 is composed of a plurality of square-shaped holes size for 200 μm sized particles. As the coffee grinds move in tandem with the shaking of the body 104, certain coffee grinds may pass through the square-shaped holes of the filter portion 204. Those certain coffee grinds that pass through square-shaped holes may further travel in a spacing that exists between the removable filter 102 and an interior surface of the body 104. Those certain coffee grinds may further settle at the detachable cap 106 after passing through square-shaped holes.

The lid assembly 100 (i.e. "precise pouring lid") may have an attached hinged surface that may be moved in order to cover or reveal an aperture of the lid assembly 100. For example, the hinged surface may be swung open so as to reveal the aperture of the lid assembly 100. There is a feature on the lid assembly to hold the hinged surface open when it is swung open. When the aperture is revealed, the aperture provides access to the coffee grinds that remain within the interior of the removable filter 102 during the time period when the body 104 was being shaken. For example, those coffee grinds that remain within the interior of the removable filter 102 did not pass through square-shaped holes of the filter portion 204 of the removable filter 102.

With the hinged surface of the lid assembly 100 swung open to reveal the aperture, the coffee grinds within the interior of the removable filter 102 may be poured out of the body 104 through the aperture. (Act 306) The fines may be collected by decoupling the detachable cap 106 from the body 104. (Act 308)

Figure 4:
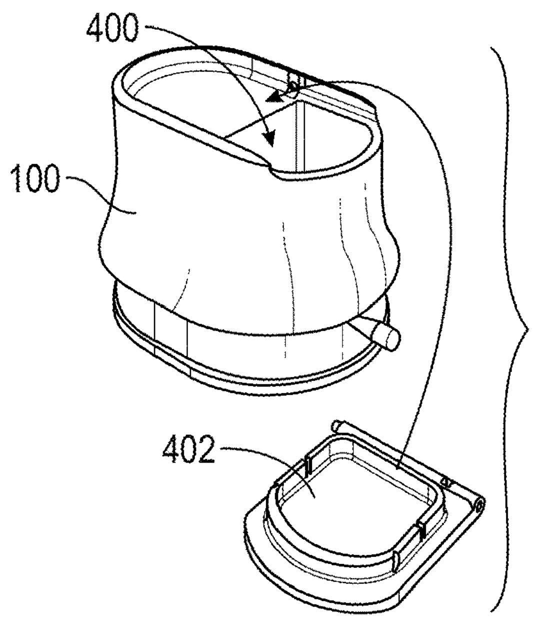
FIG. 4 is a diagram illustrating an exemplary embodiment.

As shown in FIG. 4, the lid assembly 100 includes an aperture 400 and a movable hinged surface 402 for opening and covering the aperture. The hinged surface 402 may be coupled to the lid assembly 100. In various embodiments, the lid assembly 100 is composed at least in part of polypropylene and may further include one or more silicone gaskets. In various embodiments, the lid assembly 100 may be entirely composed of polypropylene According to various embodiments, the lid assembly 100 includes a hinged surface 402 that can be moved toward the lid assembly 100 to be snapped in place. Once the hinged surface 402 is snapped in place it covers an aperture 400 of the lid assembly 100. The hinged surface 402 can be unsnapped and pulled away from the lid assembly 100 to reveal the aperture 400 and to make the aperture 400 of the lid assembly 100 accessible. In various embodiments, a shape of the lid assembly 100 is complementary to a shape of the aperture 400 such that both shapes allow for the ease of pouring coffee grounds out of the body 104 and removable filter 102. There are also features that keep the hinged surface 402 fixed in the pulled back position when pressed all the way back.

Figure 5:
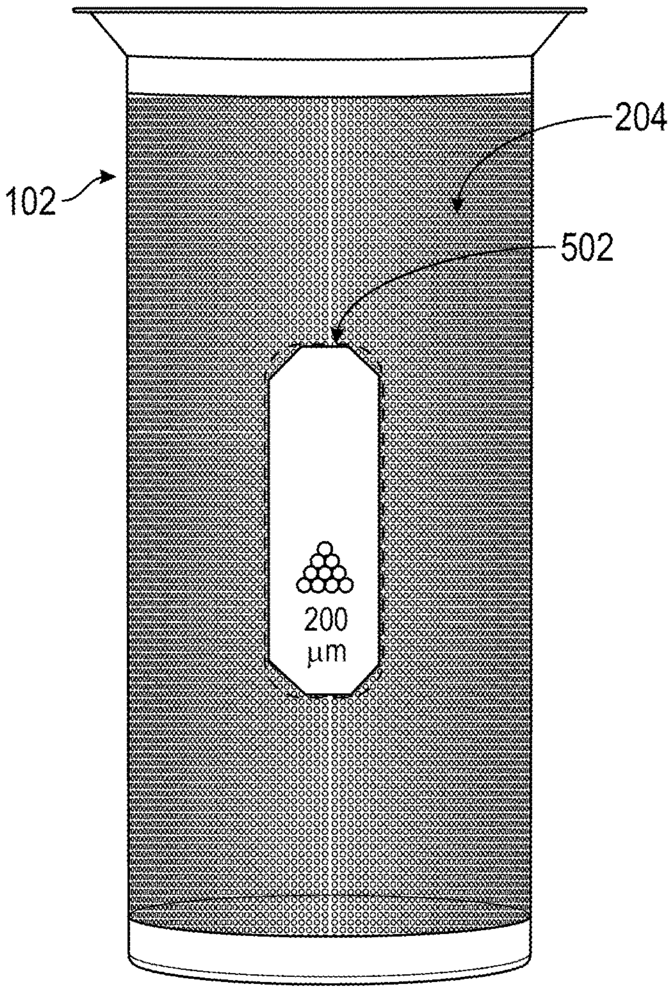
FIG. 5 is a diagram illustrating an exemplary embodiment.

As shown in FIG. 5, according to various embodiments of the removable filter 102, the filter portion 204 may further include a window aligned portion 502 that may be visible through a window of the body 104 when the removable filter 102 is situated within the body 104.

Figure 6:
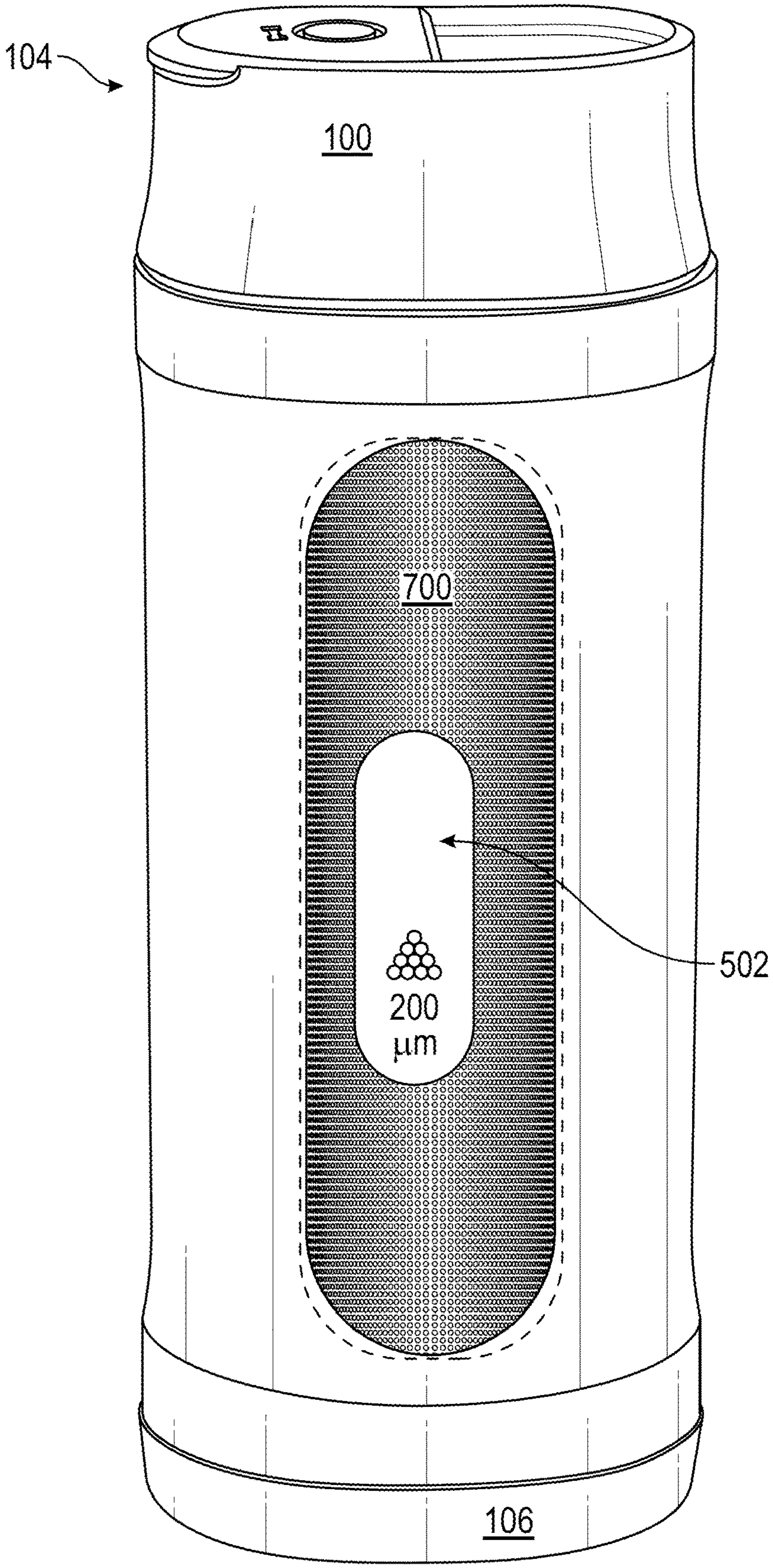
FIG. 6 is a diagram illustrating an exemplary embodiment.

FIG. 6 provides an illustration of a side view of an exemplary embodiment. The hollow sieve body 104 may include a window portion 700 that is transparent to provide a view into a window aligned portion 508 of the removable filter 102 when the removable filter 102 is disposed within the hollow sieve body 104.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. An apparatus, comprising:

a removable filter disposed within an interior of a hollow sieve body, the hollow sieve body comprising a first opening, a second opening, and a transparent window arranged to provide a view inside the interior, wherein the removable filter includes a window aligned portion that is visible through the transparent window when the removable filter is situated within the hollow sieve body;

a first edge of the removable filter situated on an edge of the first opening of the hollow sieve body;

a detachable lid assembly connected to the first opening of the hollow sieve body, which can hold the surface of the removable filter in place that terminates at the first edge; and a detachable cap connected to the second opening of the hollow sieve body.

2. The apparatus of claim 1, wherein the hollow sieve body is composed at least in part of a type of plastic.

3. The apparatus of claim 1, wherein the hollow sieve body comprises a hand-held sieve body.

4. The apparatus of claim 1, wherein the removable filter comprises a filter portion and a solid surface portion, the solid surface portion terminating at the first edge.

5. The apparatus of claim 4, wherein the filter portion comprises a plurality of square-shaped filter holes for 200 micron-shaped particles.

6. The apparatus of claim 1, wherein the removable filter is composed at least in part of SUS304 stainless steel.

7. The apparatus of claim 1, wherein the lid assembly comprises an aperture and a movable hinged surface for opening and covering the aperture.

8. The apparatus of claim 7, wherein the lid assembly is composed at least in part of polypropylene, the lid assembly further comprising one or more silicone gaskets.

9. The apparatus of claim 1, wherein the detachable cap is composed at least in part of polypropylene.

10. The apparatus of claim 1, wherein the removable filter includes vertical walls that are vertically aligned parallel to vertical walls of the hollow sieve body.

11. The apparatus of claim 10, wherein the vertical walls include a filter portion of the removable filter.

12. The apparatus of claim 1, wherein the hollow sieve body is configured to be hand-held and shaken to facilitate filtering of materials inside its interior.

13. An apparatus, comprising:

a removable filter disposed within an interior of a hollow sieve body, the hollow sieve body comprising a first opening, a second opening, and a transparent window arranged to provide a view inside the interior, wherein the removable filter is configured to separate smaller coffee fines from larger coffee grounds;

a first edge of the removable filter situated on an edge of the first opening of the hollow sieve body;

a detachable lid assembly connected to the first opening of the hollow sieve body, which can hold the surface of the removable filter in place that terminates at the first edge; and a detachable cap connected to the second opening of the hollow sieve body, wherein the apparatus is configured such that the larger coffee grounds remain within the removable filter while only the smaller coffee fines pass through the removable filter into the detachable cap, and wherein the apparatus is configured such that the larger coffee grounds are readily removed from the apparatus by opening a hinged surface at the detachable lid assembly while the smaller coffee fines are readily removed from the apparatus by decoupling the detachable cap from the hollow sieve body.

14. A coffee sieve, comprising:

a hollow body having an interior, a top opening at a top end, a bottom opening at a bottom end, and one or more exterior walls extending vertically between the top and bottom ends to define the hollow body interior, wherein the hollow body includes a transparent window along its one or more hollow body exterior walls, the transparent window arranged to provide a view of the hollow body interior;

a removable filter disposed within the hollow body interior, the removable filter having a filter portion arranged vertically, extending from the hollow body top end, and spaced apart from the one or more hollow body exterior walls, wherein the removable filter includes a window aligned portion that is visible through the transparent window when the removable filter is situated within the hollow body;

a detachable lid assembly coupled to the hollow body top end and configured to hold the removable filter in place against the hollow body at its top end; and a detachable cap coupled to the bottom opening of the hollow body.

15. The coffee sieve of claim 14, wherein the coffee sieve is configured to be hand-held and shaken to facilitate filtering of coffee grounds inside its interior, and wherein the removable filter is configured to separate smaller coffee fines from larger coffee grounds such that the larger coffee grounds remain within the removable filter while only the smaller coffee fines pass through the removable filter into the detachable cap.

* * * * *